Dec. 29, 1964   M. D. FEMRITE   3,163,463
DUMP BODY WITH RADIUS SIDE PLATES
Filed Feb. 7, 1964

Merrill D. Femrite
INVENTOR.

BY Ramsey, Kolisch + Hartwell
Attys.

United States Patent Office 3,163,463
Patented Dec. 29, 1964

3,163,463
DUMP BODY WITH RADIUS SIDE PLATES
Merrill D. Femrite, Portland, Oreg., assignor to Wentworth & Irwin, Inc., Portland, Oreg., a corporation of Oregon
Filed Feb. 7, 1964, Ser. No. 343,324
8 Claims. (Cl. 296—28)

This invention relates to metallic vehicle bodies having a floor and upstanding marginal side and end members, and particularly to those that are adapted to carry loose material, such, for example, as dump bodies and pickup bodies.

Due to the stresses placed upon said bodies and to the rough usage to which they are put, it is commonly considered necessary to mount the sheathing plates forming said upstanding marginal walls with plural vertical posts, extending intermediate the corner posts. Said posts are commonly provided not only to resist internal lateral pressure, but also to resist vertical crushing of said bounding walls when heavy loads are dropped or otherwise placed upon the upper edges which constitute rail portions.

Sheathing said posts are inner plate members which are welded or otherwise secured to the posts, and which together form strong integral structures to serve the functions for which they are devised. In heavy work it is essential that these members be made extremely massive and this increases the dead weight of the vehicle body which diminishes the payload that a vehicle can carry.

Said post-and-plate structure also has another serious disadvantage, namely that it provides a number of lateral flanges or shelves which constitute dust collectors. It is the experience of the industry that truck bodies formed in this fashion quickly accumulate layers of dirt, particularly in highway construction, which add as much as several hundred pounds to the dead weight of the vehicle. If the bodies are washed to eliminate such accumulations, a substantial expense is involved not only in the cleaning operation, but also in tying up the vehicle during said cleaning operation.

Although such type of vehicle bodies are pre-eminently utilitarian the purchasing public also requires that they be streamlined because said streamlining cuts down air friction, particularly if the vehicles are used at high road speeds.

The object of my invention is to provide a vehicle body of this character with side wall members and also rear wall members which may be made entirely devoid of external posts, except at the corners. Each of the upstanding wall members is made of two mated plates, an inner one being substantially plane and an outer one being curved upon a more or less smooth sweep. Because of the curvature of the outer plate, the longitudinal edges thus stand apart and are joined at the top by a rail member. At the bottom fastening devices secure them to the frame of the vehicle. At or near the longitudinal center line of said upstanding bounding members, the outer plate comes into face-to-face contact with the inner plate and at this point it is desirable that the plates be joined together, as by welding.

A further object of my invention is to provide in a vehicle body having a wall structure that is made of two mated plates and is strong and rigid, and yet lightweight. The outer plate is curved and the inner plate is plane and they are joined together at the upper margins of each, at the lower margins and also intermediate said margins, substantially near the midpoint. To inhibit crushing of said walls, due to heavy loads resting or dropped thereon, a reinforcing rail is incorporated into each upstanding wall, intermediate the upper spaced edges of said two plates. The inner plate is provided with a lateral flange which nests over said reinforcing plate to produce a box structure which per pound of weight possesses extreme resistance to flexure and to deformation. The lower edges of said mated plates, constituting said upstanding bounding wall, are spaced apart and are joined to resist overturning movement to which said bounding walls are subject.

A further object of my invention is to provide bounding walls for vehicles having an inner plane plate and an outer curved plate. The plates are joined substantially at their midpoints, one with the other, and at their upper and lower edges have reinforcing members so that the curvature of the outer plate, when joined to the inner plate, in this fashion, provides an extremely sturdy and lightweight construction.

Further and other objects of my invention, and the details of construction thereof are hereinafter disclosed and described in connection with the accompanying drawings, in which.

Figure 2:
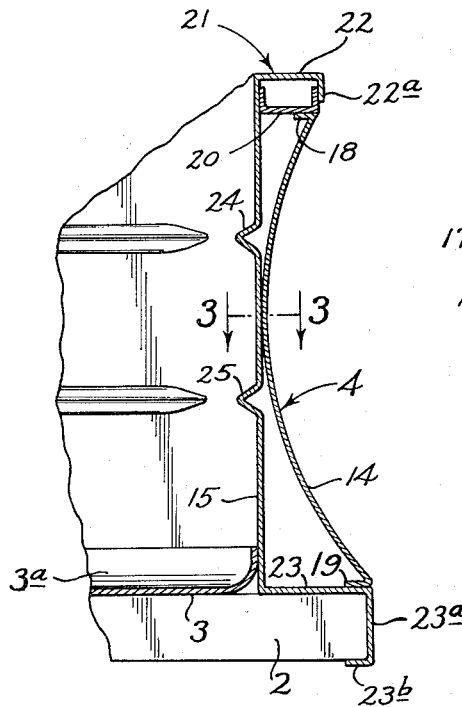
FIG. 2 is an enlarged detailed sectional view taken on the lines 2—2 in FIG. 1 to disclose the details of construction of one of said bounding side walls.

My invention is disclosed in connection with a metallic dump body 1 provided with a laterally extending frame member underlying the entire body and particularly the wall portions thereof. Supported by said frame member is a floor member 3 which is generally plane but has upturned marginal portions 3a, as is shown most clearly in FIG. 2. Upstanding bounding walls surround the four sides of said frame in a dump body and comprise side wall members 4–5, front wall member 6, and rear wall member 7. In a dump body, said rear wall member preferably is hinged at the top of each of the rear ends 4a–5a of the side members and constitutes a tail gate. The mounting is made through a pair of brackets 8, one mounted on each end of said side walls, having a pivot pin 9 joining each of said brackets. Hinge plates 7a are arranged, one at each end of the rear wall member, and said hinged plates are welded to the frame of the member 7 and are pivotally joined to the brackets 8 by the pivot pins 9.

Extending vertically above and laterally forward of the upper edge of the front wall member 6 is a protective canopy 10 which, when mounted upon a truck chassis, affords protection for the driver when said truck body is being filled and being emptied. The front wall member is preferably made of two more or less plane plates 11 and 12 curved at their ends 11a to constitute rearwardly extending flanges which join with the forward ends of the side wall members 4 and 5, respectively. The innermost plate 11 in said upstanding forward wall is preferably provided with strengthening and stiffening corrugations 13 so as to resist longitudinal and lateral flexure.

The two side walls 4 and 5 are identical except that they are opposite hand. Wall member 4 will be described but the remarks concern side wall member 5 with equal effect.

Figure 3:
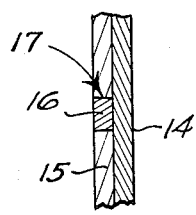
FIG. 3 is a further enlarged sectional view taken on the line 3—3, in FIG. 2, to illustrate the manner in which the inner and outer plates of said upstanding wall are joined together, as by plug welding, leaving the exposed outer face of the plates smooth and unmarked.

Referring to FIG. 2: Each side wall extends the full length of the vehicle body and comprises two plate members 14 and 15, plate 14 being the outer wall element, and 15 the inner wall plate element. The outer wall element comprises a plate that is bent upon a curved sweep, as is illustrated in FIG. 2 and may or may not be upon a truly circular sweep. As is illustrated in FIG. 2, the upper half of the sweep, that is the portion thereof lying above the section line 3—3 is shorter and is slightly more divergent with respect to the plane of the inner plate element 15. The portion of the outer plate below the section line 3—3, diverges to a greater degree than the upper half, as is illustrated. Thus, the angle subtended by the lower portion of the outer plate 14 with the horizon is approximately the same as that between the upper edge and the horizon. The purpose of said substantial divergent angle is so that the outer plate will stiffen and support the inner plate which is the one immediately adjacent the load carried in the body. Each of the edges, that is the upper edge and the lower edge, thus constitutes curved props which tend to prevent flexure of the inner plate element, and the wall member generally. This is particularly true when said plates are welded together by plug welding 16, as is illustrated in FIG. 3.

Figure 1:
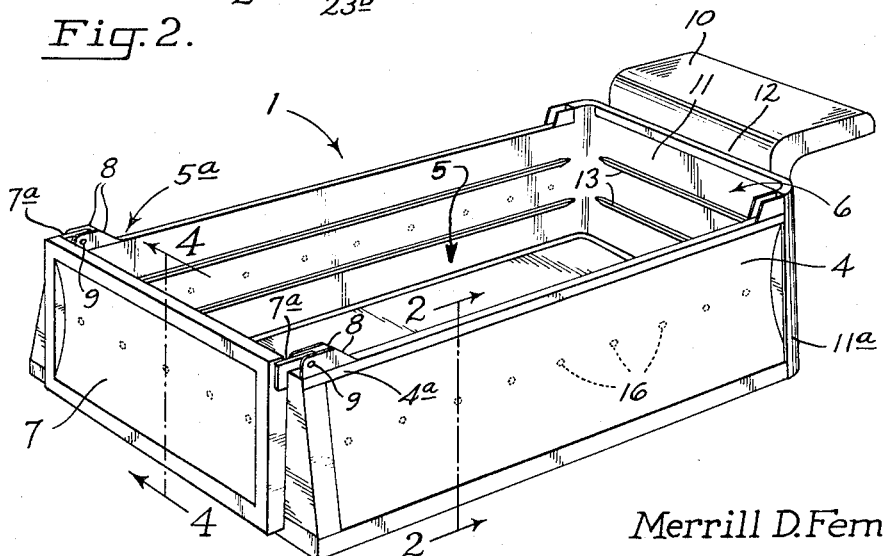
FIG. 1 is a perspective view of a vehicle body embodying my invention, it being shown as incorporated in a dump truck body.

As is shown in FIG. 1, the two sheets are plug welded at modular spacing along the full length of said side wall members 4 and 5. The outer sheet is imperforate while the inner sheet is perforated and thus when each perforation 17 is filled with welding rod and bonded to the adjacent face of the outer plate element, it constitutes a firm connection so that the two plates are in effect integral with each other.

At the upper margin of the outer plate a lateral flange 18 is formed to face the outer face of the inner plate member 15. A similar lateral flange 19 is formed on the lower edge of said outer plate element 14. These flanges give some additional reinforcing and stiffening to the outer plate. Their primary purpose is to provide a substantial area over which the edges of the outer plate may be welded tightly to the inner plate element 15 and to a reinforcing channel or U-shaped reinforcing member 20 which forms a part of the rail 21 running the entire length of the upstanding sidewall members.

The inner plate element 15 is provided with a laterally turned flange 22 at its upper end, terminating in an ancillary dependent flange 22a. The lower edge of the inner plate element is formed into a laterally turned flange 23 and extends laterally outwardly of the vehicle body. Said flange 23 has a dependent flange 23a at its edge with an inturned margin 23b at the extreme terminal portion thereof. The flange 23 with its dependent flange portions 23a and the inturned flange 23b tends to lie upon and to encircle the side and extend below the frame member 2, as is shown in FIG. 2. Thus it sheaths its top and side and partially sheaths its under surface and constitutes a lower securing member.

The inturned top and bottom flanges 18 and 19, respectively, are welded in face-to-face relationship with the reinforcing channel 20 and the flange 23 of the inner plate member 15. Also, the upturned margin 3a of the floor member is preferably welded to the inner face of the inner plate element 15.

Spaced reinforcing corrugations 24 and 25 are formed in the mid-portion, considered vertically, of the inner plate member so as to strengthen said member. Said corrugations usually are deformed to extend inwardly into the body and thus be in better position to resist flexure and deformation of said inner plate. The plug welds, as is indicated, extend in a line at modular distances and substantially at the midline between said corrugations. The two plates 14 and 15 are braced at their edges and are welded together to constitute an extremely strong light sidewall, capable of resisting crushing blows as well as stresses that would tend to cause the wall members to be forced apart laterally, usually exerted outwardly, from within the body of the truck.

To prevent dirt, dust and other foreign matter which is usually airborne, from collecting upon the external face of the outer plate member, the curvature thereof merges smoothly into the upper rail and with the lower frame member and the capping therefore, in an unbroken line. Thus there are no horizontal surfaces exposed to the weather to constitute shelves or dust catchers which add to the dead weight of the vehicle, and detract from its cleanliness.

Figure 4:
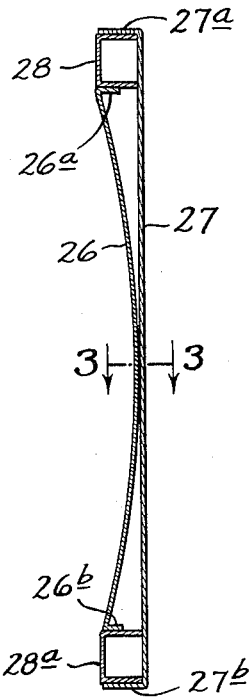
FIG. 4 is an enlarged sectional view taken through the tail gate of said dump body, substantially on the line 4—4, in FIG. 1.

The rear wall member 7 which is the tail gate of a dump truck, is made similarly, as is illustrated in FIG. 4. The external plate 26 thereof is curved upon a smooth sweep, extending substantially equally from the mid-line towards the edges thereof. At the upper and lower ends of said outer plate are inturned flange 26a and 26b, respectively. An internal plate 27 terminates at its upper edge in an out-turned flange 27a and at its lower edge, a similar flange 27b. Channel members 28–28a, at the top and bottom, respectively, of said rear wall member, lie upon their sides and the two sides of said channels, respectively, facing each other are welded to the adjacent flange ends 26a–26b of the external plate. The webs of said channels lying most distant from each other, lie within and are welded to the upper and lower inturned flanges 27a–27b of the internal plate 27, thus said flanges surrounding said rear wall member form box structures which reinforce, stiffen and protect the tail gate.

To illustrate that said external and internal plates 26 and 27 are welded together in a manner similar to inner and outer plates 15 and 14, respectively, section line 3—3 is applied to FIG. 4 and similar reference letters would apply equally to the plug-welding in the upstanding side members and the rear upstanding member which, being hinged, constitutes the tail gate for the vehicle body.

I claim:

1. A metallic vehicle body, comprising a frame having side edges, a floor member, two upstanding elongated side wall members, and a front end wall member joining together the adjacent ends of the side wall members,
    each of the side wall members including an upper rail member and a lower securing member joined to the frame member adjacent an edge of the floor member,
    each side member comprising an inner plate member and an outer plate member,
    the outer side plate member extending along a smoothly curved sweep from the upper rail member to the lower securing member, and lying in mating relationship with a companion outer plate member having a companion side wall member.

2. The structure defined in claim 1 modified in that the inner plate members are substantially plane and each of the mated pairs of inner and outer plate members are joined together by a rail member at one edge, also joined adjacent the lower securing members at the opposite edge, and said mated plate members are also joined together along a line lying intermediate said rail and said securing member.

3. The structure defined in claim 2 modified in that each inner plate member has a pair of spaced integral reinforcing corrugations defined therein, the intermediate point of joinder lying between said spaced corrugations in the inner plate member.

4. The structure defined in claim 2 modified in that each of said upper rail members comprises a U-shaped reinforcing element, nested within a laterally extending flange at the upper edge of the said inner plate member.

5. The structure defined in claim 2 modified in that each outer plate member includes inturned integral flange members serving as a joining element with a rail member and with a lower securing member, respectively.

6. The structure defined in claim 2 modified in that the upper and lower edges of each outer plate member terminate in a vertical plane extending to the maximum width of the edge of the upstanding wall member including said plate member.

7. An open topped elongated metallic vehicle body having upstanding side members and upstanding front and back members,
- at least said side members and the back members comprising a pair of registering and mated plate elements, one being an inner plate element and the other being an outer plate element joined at their top and bottom edges and along a line lying intermediate said edges,
- the inner plate element of each of said mated upstanding members being plane and the outer being curved inwardly toward its mated inner plate element, said plate elements being spaced apart adjacent their outer edges and coming into face-to-face abutment adjacent their median lines to reinforce said inner member.

8. The structure defined in claim 7 modified in that the upstanding back member is pivotally secured between the rearward ends of the upstanding side members.

References Cited by the Examiner
UNITED STATES PATENTS

| | | | |
|---|---|---|---|
| 1,989,125 | 1/35 | Atwell | 296—28 |
| 2,032,840 | 3/36 | Flowers | 298—17 |
| 2,945,721 | 7/60 | Chaney | 296—28 |

A. HARRY LEVY, *Primary Examiner.*